United States Patent
Kamimura et al.

(10) Patent No.: US 7,340,160 B2
(45) Date of Patent: Mar. 4, 2008

(54) IMAGING APPARATUS

(75) Inventors: Junji Kamimura, Yokohama (JP);
Ryuji Nishimura, Yokohama (JP);
Toshirou Kinugasa, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 308 days.

(21) Appl. No.: 11/208,247

(22) Filed: Aug. 19, 2005

(65) Prior Publication Data

US 2006/0171694 A1 Aug. 3, 2006

(30) Foreign Application Priority Data

Feb. 1, 2005 (JP) .............................. 2005-025006

(51) Int. Cl.
*G03B 17/00* (2006.01)
*H04N 5/228* (2006.01)
(52) U.S. Cl. ..................................... 396/52; 348/208.6
(58) Field of Classification Search ........... 348/208.99, 348/208.1, 208.2, 208.4, 208.5, 208.6; 396/52, 396/54, 55
See application file for complete search history.

(56) References Cited

U.S. PATENT DOCUMENTS 5,517,243 A * 5/1996 Kudo et al. ................. 348/296

FOREIGN PATENT DOCUMENTS

| JP | 02-231873 | 9/1990 |
|---|---|---|
| JP | 2002-135659 A | 5/2002 |
| JP | 2002-287197 A | 10/2002 |
| JP | 2002-287198 A | 10/2002 |
| JP | 2002-296633 | 10/2002 |
| JP | 2005-198148 A | 7/2005 |
| JP | 2005-354344 A | 12/2005 |

* cited by examiner

*Primary Examiner*—Rodney Fuller
(74) *Attorney, Agent, or Firm*—Townsend and Townsend and Crew LLP

(57) ABSTRACT

Disclosed is an imaging apparatus capable of realizing a camera shake correction function while reducing the size and power consumption of the apparatus without deteriorating the use efficiency of an image sensor thereof. An imaging device has photoelectric conversion elements arranged two-dimensionally and a transfer path for transferring electric charge converted by the photoelectric conversion element. A motion detection unit detects motion of the apparatus according to timing pulses generated by a time management circuit at shorter intervals than exposure time. A drive circuit transfers the electric charge previously read onto the transfer path for a predetermined distance according to the detected motion. Electric charge newly read out and converted by the photoelectric conversion elements at the intervals of the timing pulses is added to the previous electric charge which has been transferred on transfer path.

7 Claims, 5 Drawing Sheets

IMAGING APPARATUS

BACKGROUND OF THE INVENTION

1. Field of the Invention

The present invention relates to an imaging apparatus such as a video camera or a digital still camera, having a function to correct camera shake.

2. Description of the Related Art

As background arts of the present invention, there are some conventional techniques. As one example of such techniques, there is Japanese Patent Laid-Open Publication (JP-A, hereinafter) No. 2002-296633.

The JP-A No. 2002-296633 describes an image pickup apparatus and a method for correcting hand shake which effectively utilize a movable range of a hand shake correcting means, ensure a wider correctable range, enhance correcting accuracy, improve an unstable initial characteristic of a corrosion driving means, and can always obtain an equivalent correcting effect.

The image pickup apparatus is so configured as to include the image blur correcting means, hand shake detecting means for detecting a motion causing the image blur, a driving means for finding a quantity for driving the image blur correcting means based on a detected result of the hand shake detecting means and making the image blur correcting means perform the predetermined operation for correcting the image blur, a correction mode switching means for specifying whether the image blur correction is performed, an instructing means for preparing to pick up the image, and an instructing means for picking up the image. The image blur correcting means has the correction driving means for driving an image pickup element in a perpendicular direction to an optical axis, supplies the correction driving means with the predetermined input in accordance with the operation of the instructing means or instructing means when an image blur correction mode is selected by the correction mode switching means, and places the imaging pickup element close to the center of its moving range.

As another example, JP-A No. H2-231873 describes an technique to correct the blurring of a camera without requiring a memory circuit by using the solid-state image pickup element for which a margin is provided in the number of picture elements in horizontal and vertical direction and deviating the reading start point of an image pickup element only by a vector reverse to the vector of the detected blurring of the camera.

The technique is configured as follows. An object, which is image-formed on the light receiving surface of an imaging device by a leans, is photoelectric-converted and it is taken out as a TV output through a signal processing circuit. On the other hand, a motion detection circuit monitors the blurring of a video signal and the information of the monitor is fed back to a sensor driving pulse generation circuit. The sensor driving pulse generation circuit moves the point of start of the image pick element only by the vector reverse to obtained vector information and corrects the blurring of the camera. Thus, in the TV output, the picture of the same contour as a standard state can be always obtained and the picture having less blurring where the blurring of the camera is corrected can be obtained.

SUMMARY OF THE INVENTION

In relation to conventional imaging apparatuses such as video cameras and digital still cameras according to the conventional techniques as described in the patent documents above, various camera shake correction methods have been proposed and put to practical use. These correction methods can be roughly divided into an optical correction method and an electronic correction method. According to the optical correction method, an acceleration sensor or the like is used to measure how much the camera has been moved by hand movement, and an optical correction lens is shifted in a plane vertical to the optical axis by the camera-shake amount thus obtained. Thus, correction is performed to cancel any deviation of the image formation position on an image pickup element (a solid image sensor such as a CCD or MOS). An image pickup element instead of the optical lens may be shifted in a plane vertical to the optical axis (image pickup element shift method) (see, for example, JP-A No. 2002-296633).

According to the electronic correction method, two image signals which have been taken by an image pickup element at two different timings are compared to determine a camera-shake amount from the positional deviation of an object to be imaged. The reading position in the image pickup element (image slice position) is shifted by the camera-shake amount thus obtained to perform necessary correction to allow the object to be located at the same position in a read-out screen (see, for example, JP-A No. H2-231873).

There has also been proposed a method which combines the optical correction method and the electronic correction method to obtain a camera-shake amount from variation in the image signal and to mechanically move the optical lens according to the camera-shake amount thus obtained.

The optical correction method as described above requires an actuator for driving a correction lens along two axes. This complicates the structure, and makes the system large-sized and expensive. The same is true of the image pickup element shifting method described in JP-A No. 2002-296633.

In contrast, the electronic correction method as described for example in the JP-A No. H2-231873 requires no actuator and hence is advantageous in reducing the size and power consumption of the apparatus. According to this method, however, the effective pixel area is reduced and adjusted within the range of the pixel sensor of the image pickup element. Therefore, the method has a demerit that it is not possible to use the entire light-receiving surface area of the pixel sensor as the effective image output area. This means that, even if an image pickup element with an increased number of pixels is employed, the benefits of such imaging apparatus cannot be fully enjoyed. Moreover, the use efficiency of the pixel sensor is deteriorated and the effective screen size is decreased as the correction amount in the camera shake correction is increased.

The present invention addresses the problems as mentioned above and aims to provide an imaging apparatus which is capable of realizing the camera shake correction function, while reducing the size and power consumption of the apparatus and yet without deteriorating the use efficiency of the pixel sensor thereof.

SUMMARY OF THE INVENTION

One preferred aspect of the present invention resides in an imaging apparatus which uses an imaging device having photoelectric conversion elements arranged two-dimensionally, and a transfer path which transfers electric charge converted by the photoelectric conversion elements. In the aspect, the imaging apparatus includes: a time management circuit which generates a timing pulse within an exposure time at intervals shorter than the exposure time; a motion detection unit which detects motion of the imaging apparatus at the intervals of the timing pulses; a drive circuit which generates a drive signal to read the electric charge from the photoelectric conversion elements to the transfer path and to transfer the electric charge on the transfer path; and a control circuit which controls the drive circuit based on the output signals from the time management circuit and the motion detection unit.

In the configuration of the aspect, the electric charge, which has previously been read onto the transfer path, is transferred in a predetermined direction for a predetermined distance in accordance with the direction and magnitude of the motion detected at the intervals of the timing pulses, and electric charge, which is newly converted by the photoelectric conversion elements at the intervals of the timing pulses, is read out and added to the previous electric charge.

In the aspect, it is preferable that the transfer path is a vertical transfer path, and that the interval of the timing pulses is obtained by equally dividing the exposure time by N.

In the imaging apparatus according to the aspect of the present invention, it is preferable that when the amount of motion detected by the motion detection unit is equal to or greater than a threshold, the control circuit controls the drive circuit to restrict the distance to transfer the electric charge within a predetermined value.

The aspect of the present invention thus permits a small-sized imaging apparatus capable of realizing the camera shake correction function without reducing the effective screen size.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF PREFERRED EMBODIMENTS

Preferred embodiments of the present invention will now be described with reference to the attached drawings.

Figure 1:
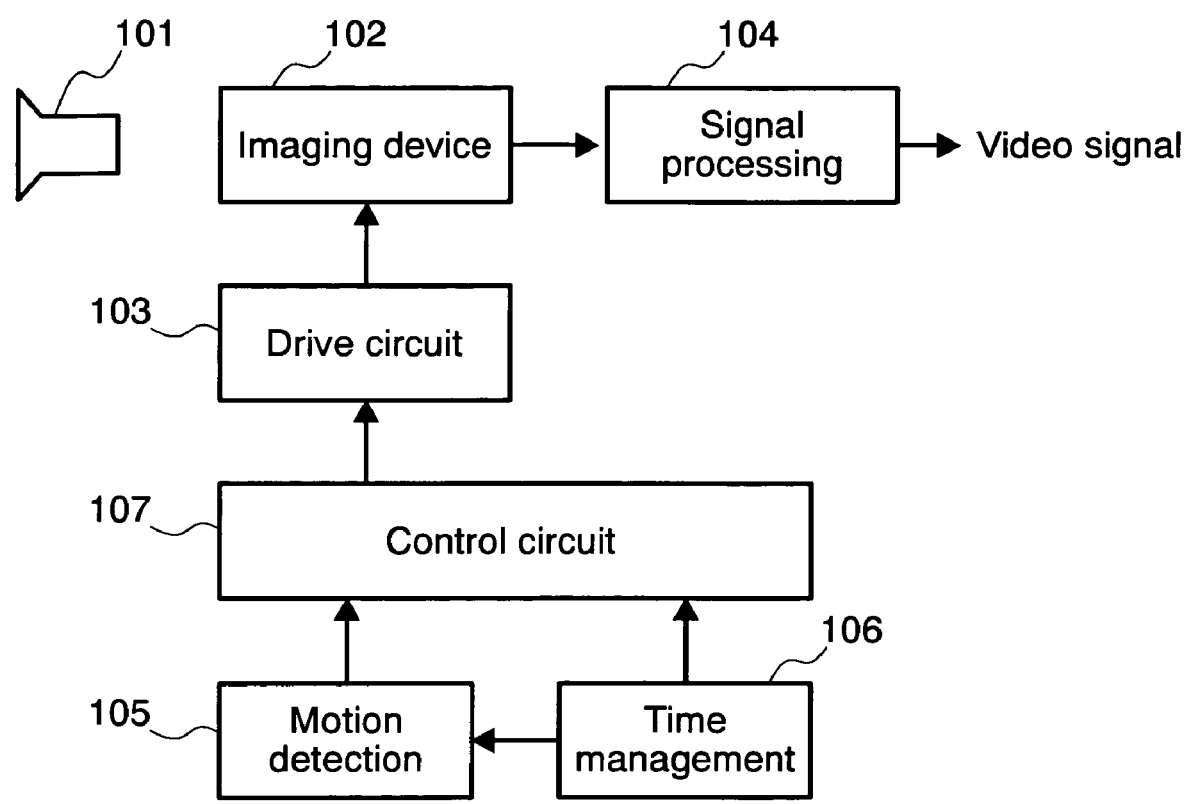
FIG. 1 is a block diagram showing an imaging apparatus according to an embodiment of the present invention.

As shown in FIG. 1, an object image received from an image pickup lens 101 is formed in an imaging device 102 composed of photoelectric conversion elements such as CCDs and converted into an electric charge signal. A drive circuit 103 generates a drive signal for transferring electric charge signals accumulated in the imaging device 102. An electric charge signal read from the imaging device 102 is subjected to predetermined signal processing at a signal processing circuit 104, and converted into a video signal. A motion detection unit 105 detects motion of the imaging apparatus caused by hand movement or the like in the form of an angular velocity or acceleration. A vibration gyro sensor, for example, is used as the motion detection unit 105. A time management circuit 106 measures exposure time or the like to generate a timing signal. A control circuit 107 receives a motion signal from the motion detection unit 105 and a timing signal from the time management circuit 106 and sends a control signal to the drive circuit 103.

Figure 2:
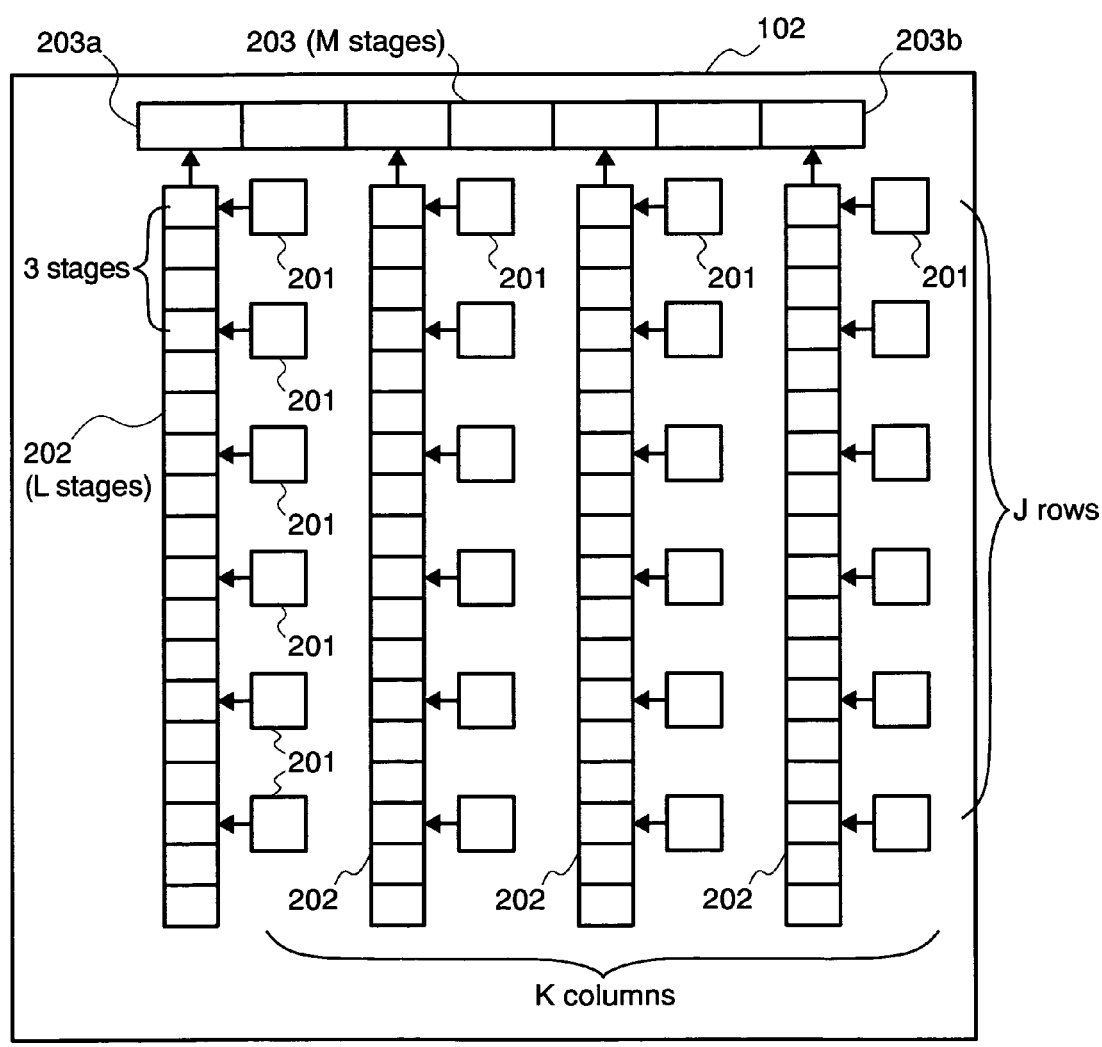
FIG. 2 is a drawing showing an internal configuration of the imaging device according to the embodiment.

FIG. 2 illustrates an internal configuration of the imaging device 102, in which a plurality of photoelectric conversion elements (photodiodes, hereafter also referred to as "pixels") 201 are arranged in a matrix of J rows and K columns. The imaging device 102 further has K vertical transfer paths 202 for vertically transferring electric charge signals read from pixels 201 in each column, and a horizontal transfer path 203 for horizontally transferring the electric charge signals transferred by the vertical transfer paths 202. The number of stages L in each vertical transfer path 202 is greater than the number of pixels J arranged vertically. In FIG. 2, three stages are provided between each two adjacent pixels (i.e., L≈3J). The number of stages M of the horizontal transfer path 203 in the drawing is set to two between each two adjacent pixels (i.e., M≈2K). The number of stages between pixels is not limited to these, and may be set to any value as required.

FIG. 3A is of a normal read-out mode (a) (no camera shake correction), while FIG. 3B is of a camera shake correction mode (b) according to the present invention. For the purpose of simplicity, description herein will be made in terms of still image photographing using an imaging device which outputs a progressive-scan black-and-white signal.

In the case of the normal read-out mode (a), electric charge accumulated in each pixel 201 during an adequate exposure time T (e.g., one field) is read out and transferred to the corresponding vertical transfer path 202 by a P-to-V transfer pulse 301 generated by the drive circuit 103.

Subsequently, a vertical transfer pulse 302 transfers the electric charge on the vertical transfer path 202 towards the horizontal transfer path 203 (forward direction), one horizontal line at a time until reaching the horizontal transfer path 203. In the image device shown in FIG. 2, the pixels are spaced by three stages in the vertical direction. Therefore, the electric charge in each line should be advanced for three stages in the forward direction along the vertical transfer path 202 to transfer the same. This means that three consecutive vertical transfer pulses 302a are required to transfer the electric charge in one line.

A horizontal transfer pulse 303 transfers the one line's worth of electric charge transferred onto the horizontal transfer path 203 in a horizontal direction and sweeps out the same from an end of the horizontal transfer path 203 (from the end 203a, for example) to the signal processing circuit 104 connected thereto. The number of consecutive horizontal transfer pulses 303a required to transfer the entire electric charge in the K pixels in one horizontal line is equal to M that is the number of stages of the horizontal transfer path 203.

Upon completion of horizontal transfer of one line's worth of electric charge, the next vertical transfer pulse 302b vertically transfers electric charge in the next line. Subsequently, the next horizontal transfer pulse 303b horizontally transfers the electric charge in the next line.

This is repeated until the electric charge in the pixels of the entire screen has been transferred (for L stages in the vertical direction). Thereupon, the electric charge of one field image has been entirely transferred. Thus, the electric charge accumulated in the pixels 201 within the adequate exposure time can be read out from imaging device 102.

In the case of the camera shake correction mode (b), the position of electric charge on the transfer path is adjusted according to a magnitude of camera shake. Description herein will be made of a case when camera shake repeatedly occurs in the vertical direction of the imaging device within the adequate exposure time T.

The time management circuit 106 generates a timing pulse 304 ($T_0, T_1, \ldots, N$) at every time period T/N obtained by dividing the adequate exposure time T (e.g., one field time) by N, and outputs the timing pulse to the control circuit 107.

Figure 3:
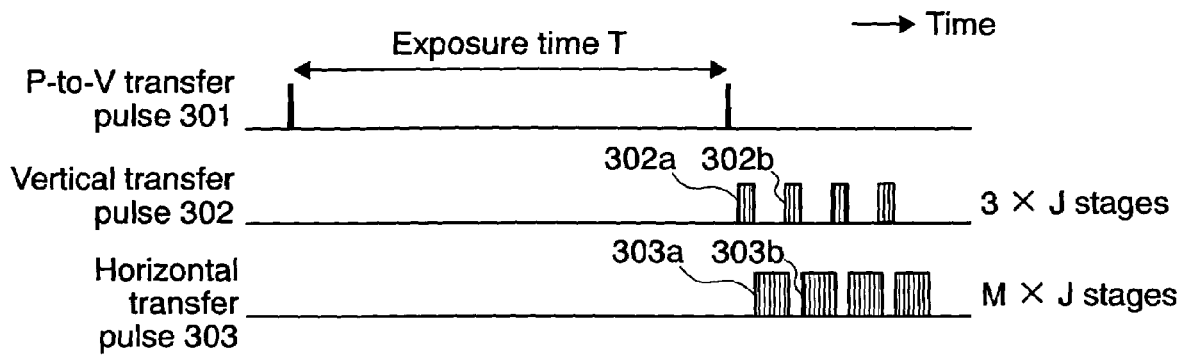
FIG. 3 is a drawing showing a method of driving the imaging device according to the embodiment.
Figure 3:
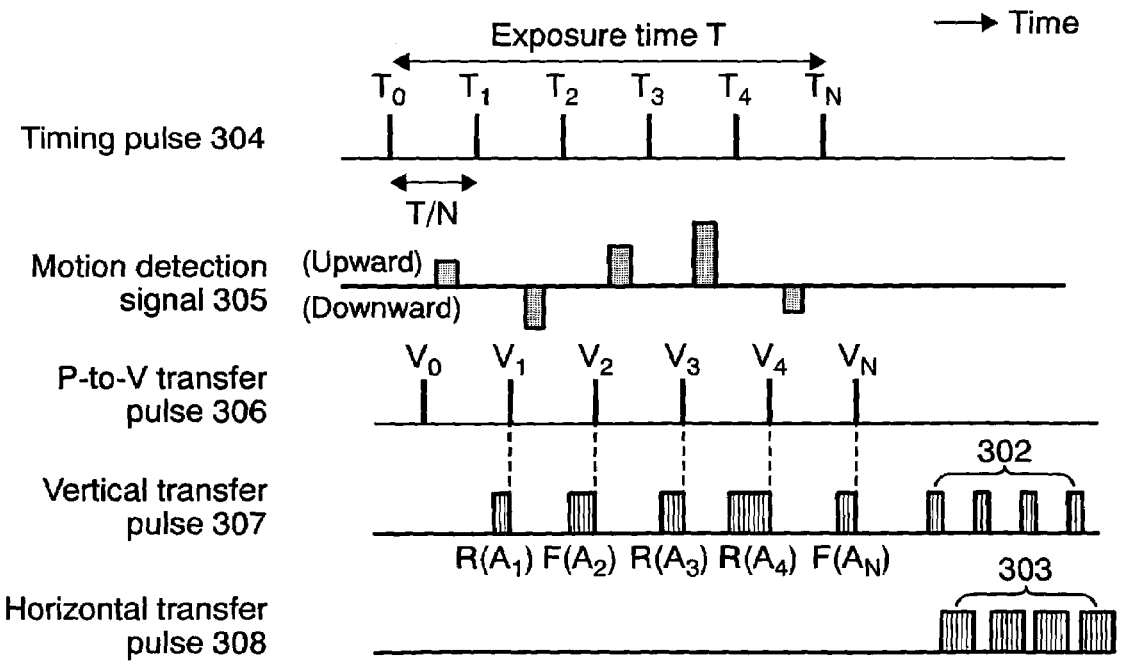

The motion detection unit 105 detects motion due to camera shake within each time period T/N at each timing pulse 304, and sends a motion detection signal 305 to the control circuit 107. In FIG. 3, upward acceleration is represented by a positive motion detection signal 305, and downward acceleration is represented by a negative motion detection signal 305. Specifically, during the time period from the timing $T_0$ to the timing $T_1$, the apparatus is under the upward acceleration, while during the time period from $T_1$ to $T_2$, the apparatus is under downward acceleration.

Receiving the timing pulse 304 and the motion detection signal 305, the control circuit 107 controls the drive circuit 103 to generate the P-to-V transfer pulse 306 and the vertical transfer pulse 307.

During the camera shake correction mode, the P-to-V transfer pulse 306 ($V_0, V_1, \ldots, V_N$) transfers electric charge accumulated in the pixels 201 to the vertical transfer path 202, at the intervals T/N of the timing pulses 304. In this case, there is, in the transfer path 202, residual electric charge for which the vertical transfer to be done field by field has not yet been completed. Therefore, new electric charge accumulated in the pixels 201 is read out and added to the residual electric charge.

During the camera shake correction mode, the vertical transfer pulse 307 transfers electric charge on the vertical transfer path 202 to the upward direction of the screen (forward direction) or to the downward direction thereof (reverse direction), according to a motion detection signal 305 which is generated during the interval T/N of the timing pulses 304, so as to execute the correction. In FIG. 3, F denotes forward transfer, R denotes reverse transfer, and the symbol in the parentheses denotes a number of stages to be transferred. These correspond to the direction and magnitude of the motion detection signal 305. Specifically, the electric charge is transferred in the reverse direction in response to upward motion, whereas the electric charge is transferred in the forward direction in response to downward motion. The number of stages to be transferred corresponds to an amount of displacement of the image formation position in the imaging device caused by the camera shake.

As to the order of the correction transfer and the addition of the electric charge, for example, the electric charge is transferred in the reverse direction for $A_1$ stages for correcting the motion which has occurred within the period from the timing $T_0$ to the timing $T_1$ and then the new electric charge of the pixels 201 is added to the vertical transfer path 202 at the timing $V_1$. Likewise, the electric charge is transferred in the forward direction for $A_2$ stages for correcting the motion which has occurred within the period from $T_1$ to $T_2$, and then the electric charge of the pixels 201 is added to the vertical transfer path 202 at the timing $V_2$.

The adequate exposure time T is thus fulfilled at the time when N times of the correction transfers and the additions have been performed, and the addition of the electric charge accumulated in one field time is completed. Then, the electric charge added and accumulated in the vertical transfer path 202 is read out and transferred. A vertical transfer pulse 307 and a horizontal transfer pulse 308 used for this transfer are similar to the vertical transfer pulse 302 and the horizontal transfer pulse 303 used in the normal read-out mode (a), and hence the description of the operation thereof will be omitted.

According to the operation as described above, even if camera shake causes the position of image formation to be shifted to a wrong pixels 201, electric charge accumulated during this period is added to electric charge at the right position on the vertical transfer path 202 where the former electric charge is originally to be added. As a result, an image without blur can be output. This effect is dependent on the number N for dividing the exposure time T, and the effect of camera shake can be reduced to substantially 1/N.

According to this embodiment, the camera shake is corrected electronically in the imaging device 102. This eliminates the need of a mechanical actuator, and enables reduction of the size and the power consumption of the imaging apparatus. Further, this system makes it possible to use signals from all the pixels 201 in the imaging device 102 as video signals. Therefore, the effective pixel area will not be reduced (the screen size will not be reduced) by adding the camera shake correction function. Further, the amount of correction can be set greater without changing the effective pixel area.

The above description of the present embodiment has been made in terms of the case when the adequate exposure time T is equally divided by N by the time management circuit 106 to perform the camera shake correction processing. However, the same effect can be obtained if the adequate exposure time T is divided unequally to perform the correction processing.

The above description of the present embodiment has been made, for the purpose of simplicity, in terms of the case using an imaging device which outputs a progressive-scan black-and-white signal. However, the present invention is also applicable with the same effect to an interlaced imaging device, or an imaging device having a color filter for outputting a color signal. Further, the present invention is also effectively applicable not only to still image monitoring and video shooting, but also to still image photography which requires long exposure.

Figure 4:
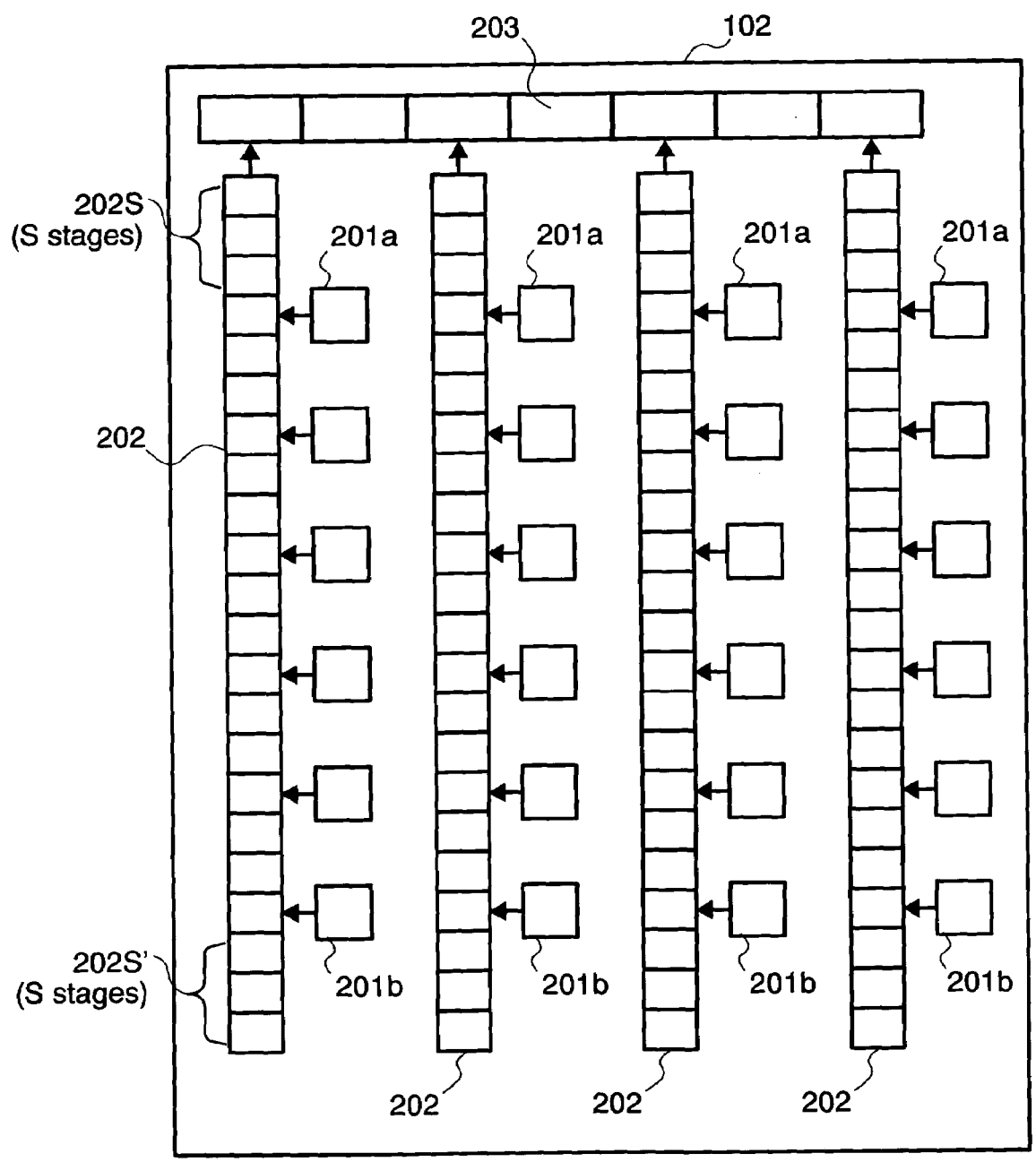
FIG. 4 is a drawing showing an internal configuration of an imaging device according to another embodiment of the present invention.

Description will now be made of an imaging apparatus according to a second embodiment of the present invention. FIG. 4 shows an internal configuration of the imaging device according to this second embodiment. Comparing with the configuration of the imaging device shown in FIG. 2, the configuration of the second embodiment is characterized in that the number of stages of the vertical transfer path 202 is increased at the opposite ends thereof.

Specifically, additional stage portions 202S and 202S' each consisting of S additional stages are provided at the outsides of each vertical region occupied by the pixels 201 (the area from the pixel 201a to the pixel 201b), respectively. The basic operation of the camera shake correction according to the second embodiment is the same as that of the first embodiment above, and hence the description thereof will be omitted. The provision of these additional stage portions 202S and 202S' makes it possible to perform the operation of transferring for correction the electric charge in the top and bottom ends of the screen (i.e., in the pixels 201a and 201b) in the forward and reverse directions, as smoothly as for the electric charge in a central part of the screen. The number of additional stages S may be determined as necessary according to magnitude of camera shake. The configuration according to the second embodiment has an advantage that favorable camera shake correction can be realized over the entire screen even if a large camera shake has occurred.

Figure 5:
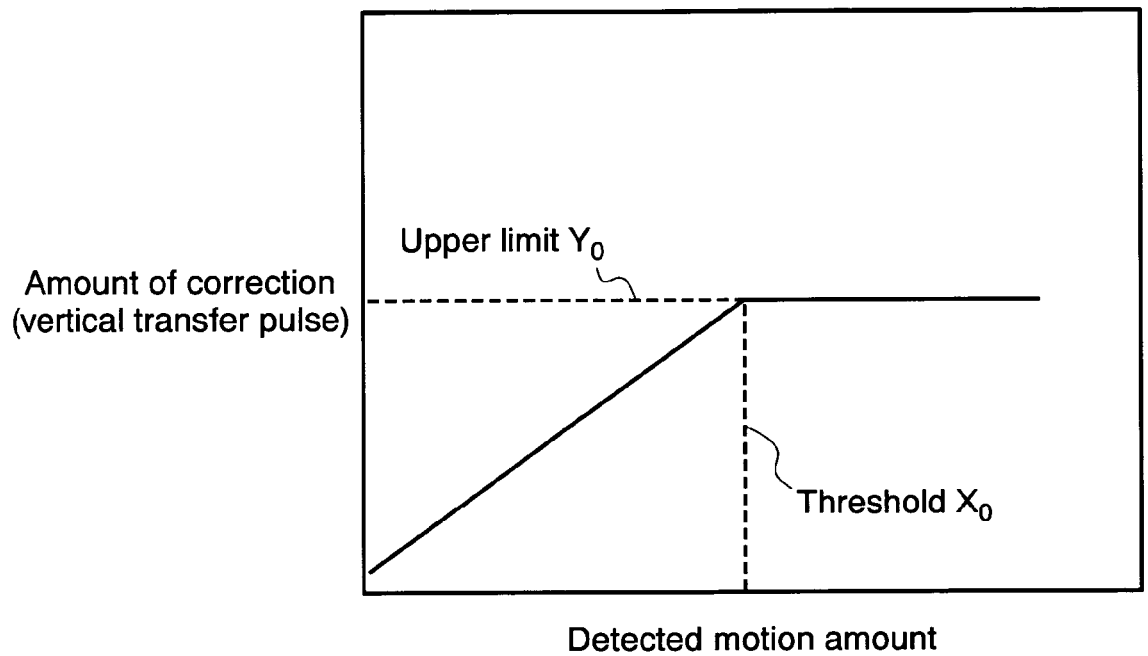
FIG. 5 is a graph illustrating a relationship between an amount of detected motion and an amount of correction according to the embodiments of the present invention.

Description will now be made of an imaging apparatus according to a third embodiment of the present invention. The imaging apparatus according to the third embodiment has the same configuration as that shown in FIG. 1, but additionally has a function of restricting the amount of camera shake correction. FIG. 5 is graph showing a relationship between an amount of detected motion and an amount of correction according to the third embodiment.

Specifically, when an amount of motion detected by the motion detection unit 105 is equal to or greater than a threshold $X_0$, the control circuit 107 controls the drive circuit 103 so as to restrict the amount of correction (that is, the number of the vertical transfer pulses) within the upper limit $Y_0$. The upper limit $Y_0$ is determined based on the number of correctable transfer stages of the vertical transfer path 202 in the imaging device 102. According to the second embodiment, in particular, the upper limit $Y_0$ is preferably determined based on the number of stages S of the additional stage portion 202S, 202S' shown in FIG. 2.

The restriction of the amount of correction makes it possible to prevent erroneous operation during addition of electric charge due to excessive correction exceeding the threshold. Further, the number of transfer stages of the vertical transfer path 202 in the imaging device 102 can be minimized and hence the circuit size can be reduced.

The function of restricting the amount of correction may be performed by the motion detection unit 105 in place of the control circuit 107. In this case, upon detecting an excessive amount of motion, the motion detection unit 105 may restrict the level of the detection signal output to the control circuit 107 to a level not exceeding the threshold $X_0$ in FIG. 5.

It should be understood that the arrangements of the pixels and the transfer paths in the imaging device have been described in relation to the embodiments for illustrative purposes only, and the present invention is also applicable to imaging apparatuses employing imaging devices with other arrangements and configurations.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications a fall within the ambit of the appended claims.

What is claimed is:

1. An imaging apparatus using an imaging device which has photoelectric conversion elements arranged two-dimensionally and a transfer path for transferring electric charge converted by the photoelectric conversion elements, the imaging apparatus comprising:

a time management circuit which generates a timing pulse within an exposure time at intervals shorter than the exposure time;

a motion detection unit which detects motion of the imaging apparatus at the intervals of the timing pulses;

a drive circuit which generates a drive signal to read the electric charge from the photoelectric conversion elements to the transfer path and to transfer the electric charge on the transfer path; and a control circuit which controls the drive circuit based on the output signals from the time management circuit and the motion detection unit, the electric charge, which has previously been read onto the transfer path, being transferred in a predetermined direction for a predetermined distance in accordance with the direction and magnitude of the motion detected at the intervals of the timing pulses, and electric charge, which is newly converted by the photoelectric conversion elements at the intervals of the timing pulses, being read out and added to the previous electric charge.

2. The imaging apparatus according to claim 1, wherein the transfer path comprises:

a plurality of vertical transfer paths which transfer electric charge converted by the photoelectric conversion elements in a vertical direction; and a horizontal transfer path which transfers the electric charge transferred by the vertical transfer path, in a horizontal direction, one horizontal line at a time, and wherein the motion detection unit detects vertical motion of the imaging apparatus, and the transfer of the electric charge on the vertical transfer paths is performed based on the vertical motion detected by the motion detection unit.

3. The imaging apparatus according to claim 1, wherein the time management circuit generates a timing pulse at intervals obtained by equally dividing the exposure time by N.

4. The imaging apparatus according to claim 2, wherein each of the vertical transfer paths has additional portions provided at the opposite ends of the transfer path corresponding to the opposite outsides of a vertical region occupied by the photoelectric conversion elements, the electric charge being transferred in the vertical transfer paths over the additional portions based on the vertical motion of the imaging apparatus.

5. The imaging apparatus according to any of claims 1 to 4, wherein when an amount of the motion detected by the motion detection unit is equal to or greater than a threshold, the control circuit controls the drive circuit to restrict the distance to transfer the electric charge within a predetermined value.

6. The imaging apparatus according to any of claims 1 to 4, wherein when an amount of the motion detected by the motion detection unit is equal to or greater than a threshold, the motion detection unit outputs to the control circuit a detection signal with a level not exceeding the threshold.

7. An imaging apparatus using an imaging device which has photoelectric conversion elements arranged two-dimensionally and a transfer path for transferring electric charge converted by the photoelectric conversion elements, the imaging apparatus comprising:

a time management circuit which generates a timing pulse at predetermined intervals;

a motion detection unit which detects motion of the imaging apparatus at the intervals of the timing pulses;

a drive circuit which generates a drive signal to read the electric charge from the photoelectric conversion elements to the transfer path and to transfer the electric charge on the transfer path; and a control circuit which controls the drive circuit based on the output signals from the time management circuit and the motion detection unit, wherein the electric charge, which has previously been read onto the transfer path, being transferred in a predetermined direction for a predetermined distance in accordance with the direction and magnitude of the motion detected at the intervals of the timing pulses to correct the positions of the electric charge converted by all the photoelectric conversion elements in the imaging device.

* * * * *